Jan. 21, 1936. M. D. AISENSTEIN Re. 19,826

PUMP

Original Filed Jan. 4, 1930 3 Sheets-Sheet 1

INVENTOR
MICHAEL D. AISENSTEIN
BY
George F. Bailey
ATTORNEY

Jan. 21, 1936. M. D. AISENSTEIN Re. 19,826

PUMP

Original Filed Jan. 4, 1930 3 Sheets-Sheet 2

INVENTOR
MICHAEL D. AISENSTEIN
BY
George F. Bailey
ATTORNEY

Jan. 21, 1936. M. D. AISENSTEIN Re. 19,826

PUMP

Original Filed Jan. 4, 1930 3 Sheets-Sheet 3

INVENTOR
MICHAEL D AISENSTEIN
BY
George F. Bailey
ATTORNEY

Reissued Jan. 21, 1936

Re. 19,826

UNITED STATES PATENT OFFICE 19,826

PUMP

Michael D. Aisenstein, Berkeley, Calif., assignor to United Iron Works, Oakland, Calif., a corporation of California Original No. 1,849,217, dated March 15, 1932, Serial No. 418,534, January 4, 1930. Application for reissue September 19, 1933, Serial No. 690,148

8 Claims. (Cl. 103—108)

This invention relates to that class of pumps commonly known as multi-stage centrifugal pumps that are provided with an inner casing in which the pump impellers are revolubly mounted and an outer casing for completely enclosing the inner casing during the operation of the pump.

The invention more especially relates to a pump having an inner and outer casing that are particularly constructed to be used when pumping hot oils against high pressures.

As that class of pumps are generally of large capacity, it is desirable to build the outer casing in the form of a circular housing with one or both ends open and to provide heads or end covers for closing the said ends and enclosing the inner casing that is mounted therein. This construction is necessary, due to the fact that the outer casing being very large and subject to heavy internal fluid pressures, it is practically impossible to seal the horizontal joints in a casing of the horizontal split type. When that type of pump, having an outer casing with end covers on, is pumping against high pressures, a tremendous pressure is exerted against the discharge end cover of the said outer casing with the result that the said cover and bolts are subjected to excessive strains, and much serious danger is involved should the cover blow off or burst and thus permit the hot oil to escape out of the pump and into the atmosphere.

Heretofore, one seal has been difficult to maintain owing to the axial movement of the one casing relative to the other and while various attempts to provide an adequate seal have been made, in general they were unsuccessful. In most of the pumps heretofore designed, the retention of the seal depended practically entirely on the inherent expansibility of compressible gaskets, so that not only was considerable force required to be exerted by such gaskets, but the necessity of frequent replacement of the gaskets made necessary the frequent dismantling of the pump and the readjustment of the casings generally on account of angular displacement.

It is therefore one of the objects of the present invention to improve pumps having an inner casing and an outer casing of the type described, by forming the parts in such a manner as to provide a separate chamber between the inner casing and the end cover of the outer casing that is subject to the highest discharge pressure of the pump, and thus separate the cover from the said highest discharge pressure, and to provide a passage leading from said chamber to the inside of the inner casing, at a point where the pressure is below the highest discharge pressure, and thus convey the lower pressure in said chamber and thereby reduce the internal pressure of the fluid against the end cover.

Another object of the invention is to provide a flange around the discharge pressure end of the inner casing and to fasten said flange on the discharge pressure end of the outer casing to substantially hold the inner casing in the outer casing.

Another object of the invention is to improve the method of balancing the fluid pressure around the outer wall of the inner casing with respect to the fluid pressure within said casing by providing a plurality of flanges around the inner wall of the outer casing, and a plurality of flanges around the outer wall of the inner casing that are constructed to seat against the said flanges in the outer casing and form a plurality of separate chambers around the outer wall of the inner casing means being provided to separately connect each of the said chambers to the fluid pressure inside of the inner casing in such a manner that will cause the respective fluid pressures on the inside and around the outside of the inner casing to most nearly balance to reduce the internal pressure strain on the inner casing.

It is another object of the invention to provide resilient packing between the said flanges to properly seal the different chambers between the suction and the discharge and to also permit the casings to expand when the pump is used for pumping hot fluids.

It is another object of the invention to provide means to prevent all possibility of the pump getting out of alignment, when the pump is used for pumping hot fluids, as the result of the metal expanding, which often causes the outer casing to move unevenly on each side of the vertical center line of the pump.

The invention further consists in the particular combination, construction and association of the different parts such as described in the following specification and possesses other objects and features of advantage, some of which, with the foregoing will be made manifest in the following description of the preferred form of the invention that is illustrated in the drawings accompanying and forming part of the specification.

It is to be understood that it is not intended to limit the invention to the embodiment shown by said drawings and description, as variations may be adapted within the scope of the invention as set forth in the claims.

Figure 1:
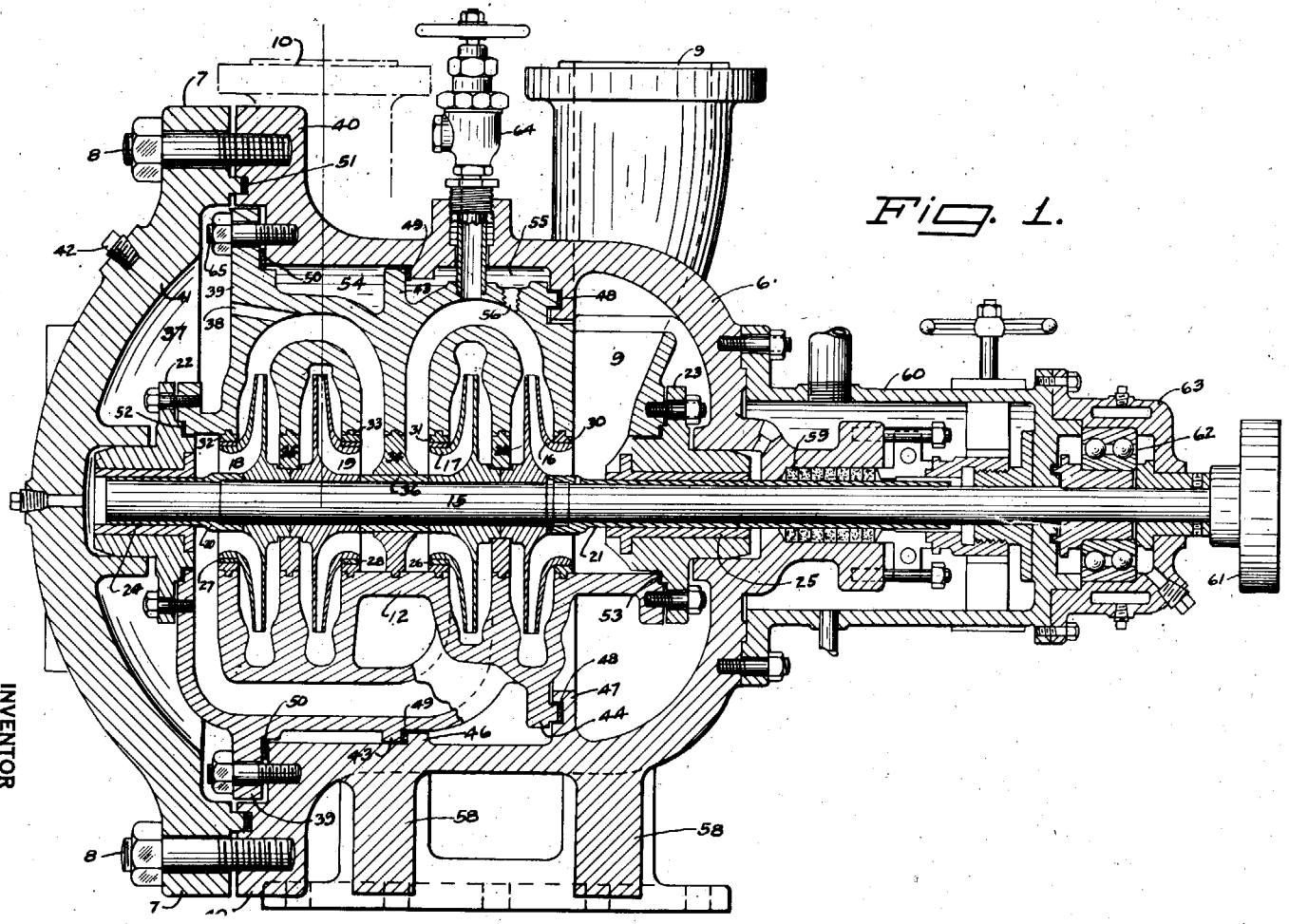
Figure 1 is a central longitudinal sectional view of a preferred type of pump involving the invention.
Figure 3:
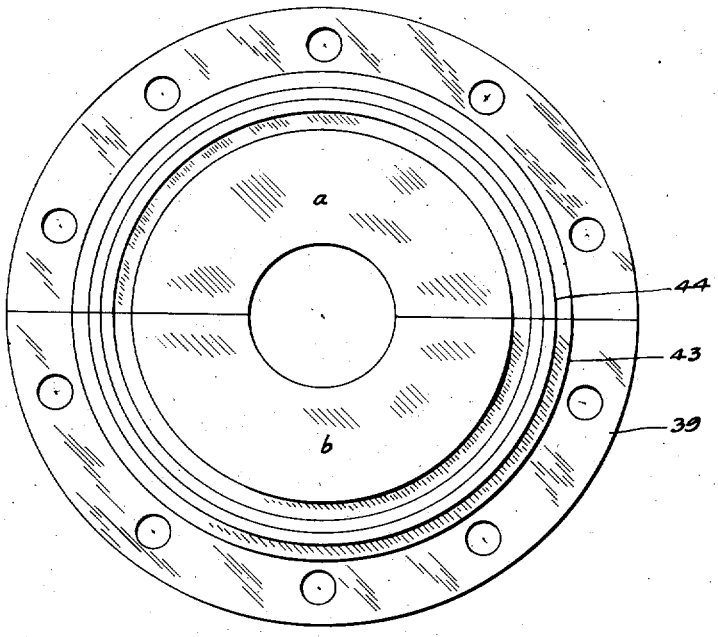
Figure 3 is an outer end view of the inner casing, looking toward the suction end, and illustrates one method in which the said inner casing may be constructed.

Referring in detail to the different parts wherein like reference numerals designate corresponding parts throughout the several views, the numeral 6 designates an outer casing that may be made in any suitable form and of any suitable metal, and the numeral 7 designates an end cover that is mounted thereon and fastened thereto by bolts or studs 8 as shown in Figure 1. Numerals 9 and 10 designate the suction inlet and discharge outlet respectively. The numeral 12 designates the inner casing which is preferably of the standard type that will serve the purpose of the invention. The upper half and lower half of the inner casing are designated by letters *a* and *b* respectively in Figures 3 and 4, and the said halves are substantially fastened together by means of bolts 14 as illustrated.

In Figure 1 there is illustrated a multistage centrifugal pump showing a main drive shaft 15 and four impellers 16, 17, 18 and 19 that are substantially fixed thereon. It is to be understood that any suitable number of impellers may be used and arranged on the shaft in any suitable manner to serve the particular class of work that the pump is to perform, and that the said inner and outer casings may be made in proportion to serve any suitable number of impellers. The shaft 15 is provided with replaceable steel sleeves 20 and 21 and is supported in bearings 22 and 23. The bearing 22 is bolted to the inner casing 12 and is centered and supported in the end cover 7 that is bolted to the outer casing. Likewise the bearing 23 is bolted to the inner casing 12 and is centered and supported in the outer casing 6. Replaceable bearing liners 24 and 25, respectively, are mounted in the said bearings 22 and 23. Numerals 26, 27 and 28 designate replaceable rings that are tightly mounted on the hubs of the impellers 17, 18 and 19, and numerals 30, 31, 32 and 33 designate replaceable rings mounted in the inner casing for revolubly supporting the impeller hubs. Numerals 29, 34 and 35 designate dividing rings and numeral 36 designates a bushing mounted on the shaft between the impellers 17 and 19.

As hereinbefore stated, one of the objects of the present invention is to reduce the internal pressure against the outer casing end cover, or in other words, to prevent the full discharge pressure from being applied against the said end cover. A preferred method used to prevent the full discharge pressure being applied against the said end cover is shown in Figure 1, and consists in providing a separate end chamber 37 between the inner casing and the end cover and providing a passage 38 that leads from the said chamber to the inside of the inner casing at a point where the fluid pressure is considerably lower than the full discharge pressure of the pump, and thus convey the said lower pressure in the chamber 37. This chamber is preferably formed as illustrated, by forming a chamber portion in the cover 7 and by providing a flange 39 around the discharge pressure end of the inner casing and mounting said flange against the outer flange 40 of the outer casing and thus completely separate the said end cover 7 from the inside of both the inner and outer casing. The passage 38 may lead to any of the different fluid passage ways in the inner casing that will give the desired pressure in the chamber 37. The present construction shows the impeller 16 located at the fluid inlet 9 and the fluid will enter the said impeller 16 and then be delivered to impeller 17, then to impeller 18, then to impeller 19 whence it is forced out of the discharge outlet 10. Assuming that each impeller increased the fluid pressure 100 pounds per square inch it will be seen that the fluid will be delivered from the impeller 16 at pressure of 100 pounds per square inch, and from impellers 17, 18 and 19, at 200, 300 and 400 pounds respectively. The passage 38 in the present illustration is shown leading into the discharge passage way of the impeller 18 where the fluid pressure would be 300 pounds pressure per square inch, or three-fourths of the full discharge pressure at the outlet, and it will thus be seen that only three-fourths of the full discharge pressure will be applied against the end cover. Of course, it is self-evident that the passage, port or aperture 38, may be threaded for a plug just as provided at 41 and 42 and also at 56, whereby the pressure in the chamber 37 would be reduced to zero if a plug was used in the aperture 38. It will also be seen that there will be no strain on the bolts 65 that hold the inner casing to the outer casing, the said bolts being used as a positively essential feature to prevent angular displacement of said casings and to always hold the said flange tight against its seat in the outer casing. An opening 41, having a pipe plug 42 threaded therein, is shown in the end cover 7 so that the gases that form when pumping hot oils may be vented from the chamber 37.

Figure 4:
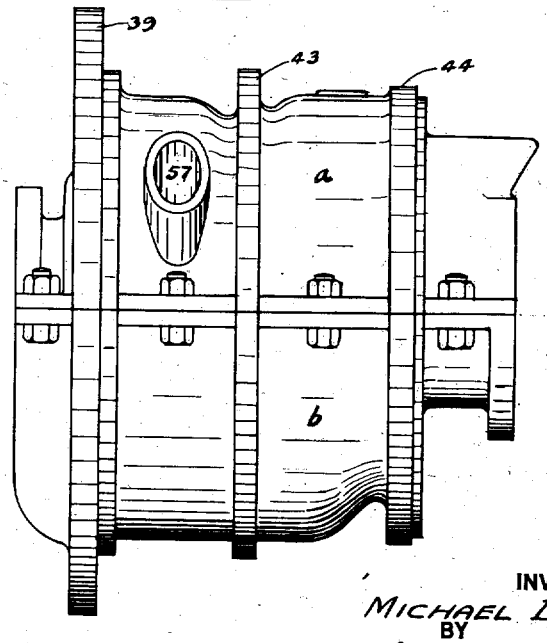
Figure 4 is a side elevational view of the inner casing, showing a plurality of flanges provided thereon.

Another object of the present invention is to provide a plurality of other chambers or peripheral spaces around the inner casing so that different pressures may be separated and to form these chambers in such a manner that very little additional cost will be added to the construction. In Figures 1 and 4 there is shown a plurality of flanges 43 and 44 provided around the inner casing. The outer casing is also provided with flanges 46 and 47 that extend around the inner wall of the said outer casing, and are spaced at such distances apart relative to the flanges on the inner casing that when the said inner casing is mounted in position the respective flanges on both the inner and outer casings will fit against each other as shown in Figure 1. Suitable gaskets, or resilient packing rings 48, 49, 50, 51, 52 and 53 are provided and located in their respective positions between the different flanges so that a tight seal will be assured and also to permit expansion and contraction of the metals when pumping fluids of various excessive high temperatures. Annular grooved joints are preferably provided to seal the inner casing end flange 44 against the outer casing flange 47 to tightly seal the space around the inner casing from the suction inlet.

From the foregoing it will be observed that a plurality of separate peripheral spaces or chambers 54 and 55 are provided between the inner and outer casing and that each chamber is tightly sealed from each other. A threaded hole 56 is provided in the inner casing to connect the fluid passage way of the impeller 17 to the chamber 55. A pipe plug may be threaded in the hole 56 should it ever be desirable to close the said passage way from the chamber 55. It will be seen that the fluid under pressure from the low pressure impellers is admitted in the chamber 55 through the hole 56 and will exert a pressure around the inner casing that will partially balance the fluid pressures exerted within the lower pressure end of inner casing. Likewise the chamber 54 is open to discharge pressure through the inner casing discharge outlet 57 (see Figure 4) and the full discharge pressure is admitted in the said chamber 54 and applied against the inner casing, and will partially balance the fluid pressures exerted within the discharge pressure end of the inner casing.

Figure 2:
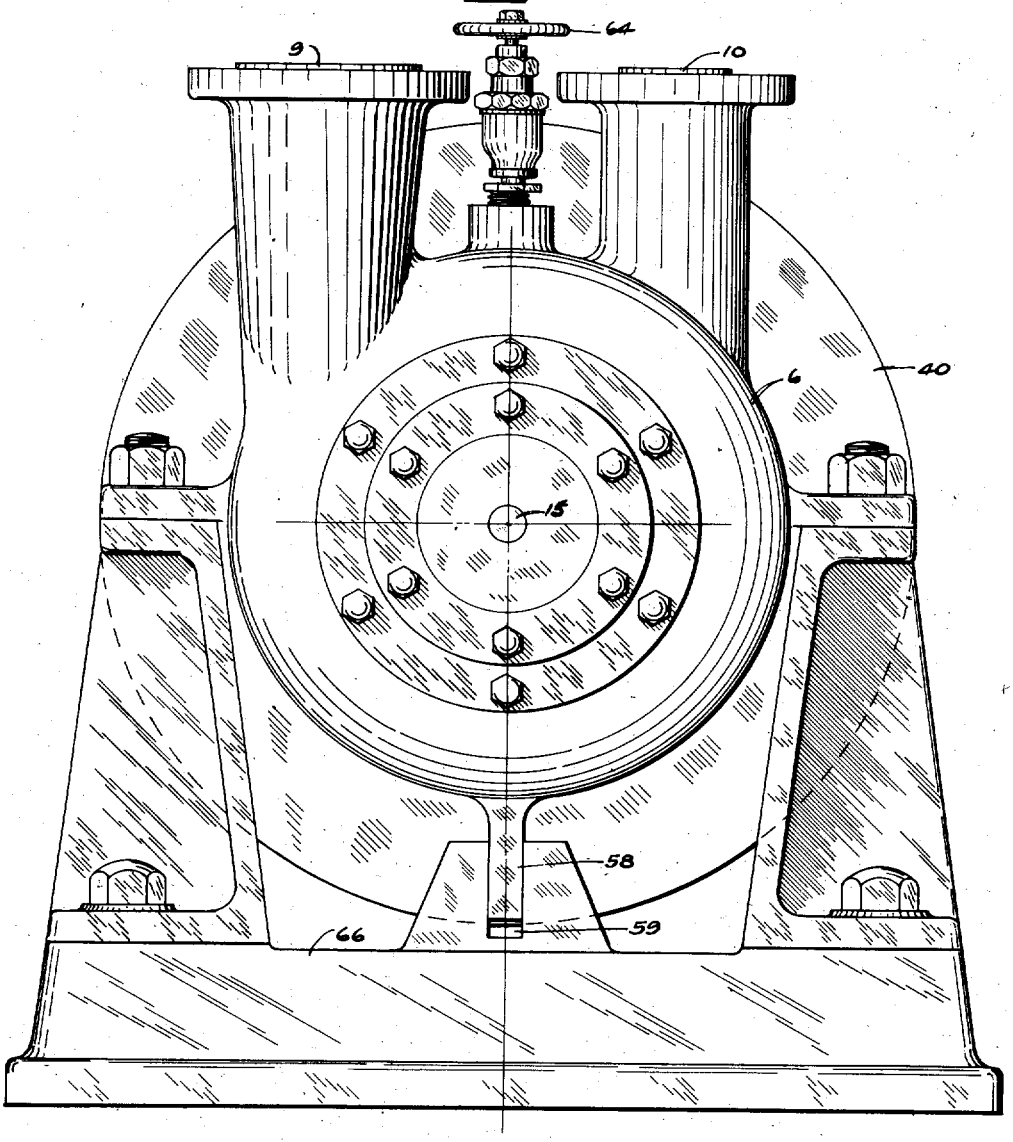
Figure 2 is an outer end view of the pump, looking toward the driven end, showing one method of keying the outer casing to the base to keep the pump drive shaft in positive true alignment.

As the present type of pump is generally used for pumping hot oils that often have various excessive high temperatures, that cause the metals to expand in varied amounts, it is very important that provision be made that will prevent any and all possibility of the expansion of the metals from forcing the drive shaft out of alignment or from interfering with the proper operation of the working parts in any manner. Explanation has already been made of a preferred means and method of construction to permit the metal of the different casings to expand and contract longitudinally without danger to breakage of the casings when the parts expand or danger of leakage when the parts contract as the result of the different temperatures. It has been found in actual practice that when the casings expand transversely the outer casing, in which the bearings are centered, often moves unevenly on one side of the vertical center of the pump instead of moving evenly on both sides thereof. This uneven movement of the casing on one side of the vertical center of the pump causes the drive shaft to get out of alignment and to bind in its bearings, resulting in much friction and wear, and requires extra power to operate the respective parts and thus reduces the mechanical efficiency of the pump. Means is therefore provided that will positively prevent the said casing from expanding unevenly on either side of the vertical center line of the pump. A preferred form of such means is illustrated in Figure 2 and consists in providing a key, or a plurality of keys 58 on the outer casing and providing a keyway 59 in the base 66 and key the said outer casing to the base. It is very important to key the said casing to the base directly on the vertical center line of the pump and thus absolutely prevent the casing from moving more on one side of the vertical center of the pump than the other. However, it is to be understood that any suitable method for keying the casing to the base that will serve the purpose of the invention may be used. In other words, any suitable number of keys may be used and formed directly on the casing, or formed separately, and fastened on the casing in any suitable manner. Likewise, the keyways may be formed directly in the base or may be formed in a separate piece and fastened to the base. While it is preferable to key the casing on the base directly on the vertical center line of the pump, it is to be understood that a plurality of keys may be provided and arranged on each side of the said vertical center of the pump and serve practically the same purpose.

Any suitable method may be used for packing the drive shaft, the present construction showing standard packing 59 preferably enclosed by a housing 60 and adapted to be adjusted by a suitable means operative outside of said housing. The numeral 61 designates a coupling or drive pulley that is fixed on the outer end of the drive shaft and is supported by the ball bearing 62 that is mounted in a housing or bracket 63 that is fastened to the packing housing or outer casing in any suitable manner. The numeral 64 designates a standard valve used to vent gases from the pump. Various other parts are involved in the general assembly, but it is not considered necessary to describe the various details as they comprise regular standard construction that are not deemed a part of the invention.

From the foregoing it will be seen that the invention involves special construction and possesses many advantages. The various chambers are formed around the inner casing without the addition of any complicated parts, adds practically no extra cost to the construction, and the admission of fluid pressure into the said chambers around the inner casing relieves much strain on the metal caused by the fluid pressures within the inner casing. It will be noted that the various flanges on the inner casing are all of a different diameter, that is, the inlet end flange 44 has a less diameter than the flange 43 and the flange 43 has a less diameter than the discharge end flange 39. This is necessary so that the pump can be readily and quickly assembled. It will be noted also, that the pump is very simple to dismantle. Fastening the inner casing end flange 39 to the outer casing positively holds the inner casing in position, prevents any movement of one casing within the other, relieves strain on the drive shaft, and positively holds the inlet end of the inner casing against the inlet end of the outer casing. The providing of the different resilient gaskets between all of the different flanges allows for metal expansion and yet always keeps the different compartments positively sealed. Keying the outer casing to the base positively prevents the drive shaft from getting out of alignment as the result of metal expansion. The provision of a separate chamber between the end cover and the inner casing and reducing the fluid pressure in said chamber as described prevents many thousands of pounds of fluid pressure from being exerted against the end cover and thus removes much excessive strain against the end cover and the bolts that hold the cover to the outer casing.

Having thus illustrated and described a certain form of construction and arrangement of parts pertaining to the invention, it is to be understood that any standard type of inner and outer casing may be used, which, obviously, may be built up in any suitable manner, the present illustration not being utilized as indicating the only arrangement and form of construction in which the parts may be made; and it is desired to includes in this application for Letters Patent of the United States of America, any and all patentable novelty that exists in the invention disclosed and all that comes within the fundamental principle of the invention as set forth in the claims hereinafter mentioned.

What is claimed:

1. A fluid pressure pump comprising an outer casing with an open end; a horizontally split casing mounted therein; a removable end cover on said open end of the outer casing; a fluid inlet and a discharge outlet in each of said casings; the space between said casings being in communication with the discharge outlet; means for sealing said space with respect to the fluid inlet; impeller means adapted to pump fluid revolubly mounted in the inner casing; an annular seat in the discharge end portion of the outer casing; a flange on the discharge end portion of the inner casing and arranged adjacent the end cover of the outer casing; space between said flange and the end cover; packing means between said seat and flange; means for fastening said flange and packing against said seat in the outer casing; and fluid conveying means leading from the inside of the inner casing at a location where the fluid pressure is below the maximum discharge pressure to the space between the flange on the inner casing and the end cover on the outer casing.

2. A fluid pressure pump comprising an outer casing with an open end; a horizontally split casing mounted therein; a removable end cover on said open end of the outer casing; a fluid inlet and a discharge outlet in each of said casings; space provided between the outer wall of the inner casing and the inner wall of the outer casing; means for sealing said space with respect to the fluid inlet; a plurality of impellers, adapted to pump fluid, revolubly mounted in said inner casing; a flange on the discharge end portion of the inner casing and arranged adjacent the end cover of the outer casing; space forming a chamber between said flange and the end cover; means for dividing the space between the inner casing and outer casing to form a plurality of chambers around the inner casing; compressible means for sealing said chambers with respect to each other; means for sealing the space formed between the casings from the space formed between the end cover and the inner casing; means for separately connecting each of the chambers around the inner casing to the inside of the inner casing to convey different fluid pressures in each of said chambers; and a port leading from the inside of the inner casing at a location where the fluid pressure is below the maximum discharge pressure to the chamber between the inner casing and the end cover on the outer casing.

3. A fluid pump including inner and outer pump casings positioned one within the other and defining therebetween an annular space and provided with inlet and discharge passages communicating with said space, impeller means in said inner casing for pumping fluid from said inlet to said discharge passage, the outer casing adjacent said discharge passage having a detachable closure, a shaft supporting the impellers, bearings for said shaft, said inner casing forming a seal with said outer casing adjacent the inlet passage and the opposite end being provided with a closure spaced from said detachable closure and forming a main bearing support adjacent said detachable closure for one shaft bearing, means including bolts for securing said inner casing closure fixedly within said outer casing whereby relative displacement of said casings is prevented, the inlet end of said inner casing also forming a bearing support for one shaft bearing in combination with means to convey fluid under pressure from the pump through the fixed closure to a position between said fixed and detachable closures substantially as described.

4. A multi-stage centrifugal pump having an outer casing and an inner casing, shaft bearings secured to opposite ends of said inner casing, cooperating sealing means on both casings located at the ends of the inner casing and additional sealing means on said casings located intermediate the other sealing means, said sealing means supporting the major portions of said casings in spaced relation, means whereby fluid pressure of the pump may be conducted to the space between the casings, said seals being arranged in stepped relation whereby the assemblage and disassemblage of the casings may be facilitated, said casings having cooperating inlet openings at one end of the pump and cooperating discharge openings adjacent the other end of said pump, said outer casing having a removable cover adjacent the discharge opening of said pump and spaced from said inner casing, the seal adjacent said cover including an apertured flange on said inner casing, said flange being secured to the outer casing by removable bolts passing through said apertures and into threaded sockets of the outer casing, whereby said casings may be drawn telescopically together and all of the seals made secure, said bearings having hubs, said outer casing and the cover thereof having sockets receiving and supporting said hubs, means securing said cover to said outer casing, means to conduct fluid from a position of low pressure in said pump to the space between the cover and inner casing whereby said cover is relieved of the maximum pump pressure of said pump, a frame, said outer casing mounted on said frame, cooperating aligning means on said frame and outer casing whereby the inner casing is also maintained in alignment and is maintained against angular displacement.

5. In a multi-stage centrifugal pump having inner and outer casings maintained in spaced relation by sealing means at each end of the inner casing cooperating with shoulders on the outer casing, means for conveying fluid under pressure to said space to partially equalize the pressure within the casings and thereby relieve them from excessive strain, one of said sealing means including an apertured flange whereby it may be bolted directly to the outer casing thereby positively maintaining the seal and preventing relative angular displacement of said casings, said outer casing having a detachable cover defining a space between the end of the inner casing and said cover in combination with means to conduct fluid from a low pressure area of said inner casing to said space whereby both said cover and the end of the inner casing are relieved from excessive strains resulting from high fluid pressure within the pump.

6. In a multi-stage centrifugal pump including inner and outer casings having cooperating inlet and discharge openings, said inner casing having a plurality of flanges located on the ends of the inner casing, said outer casing having shoulders cooperating with said flanges in combination with resilient gaskets interposed between said flanges and shoulders, positive means connecting one set of flanges and shoulders for drawing them together and thereby forming a seal at each end of the inner casing with said outer casing and for preventing relative rotation or angular displacement of said casings, shaft bearings secured to the ends of said inner casing, said bearings having hubs, the ends of outer casings having sockets to slidably receive said hubs and form additional supports for said bearings and maintain them in longitudinal alignment, a supporting frame for said pump, said outer casing secured directly to said frame, cooperating interengaging means on said frame and outer casing to prevent relative angular displacement of said outer pump casing and frame whereby all of said casings and bearings are maintained in alignment.

7. In a multi-stage centrifugal pump including inner and outer casings, said inner casing having a plurality of flanges, said outer casing having a plurality of shoulders cooperating with said flanges in combination with resilient gaskets located between said flanges and shoulders, said flanges and shoulders supporting said inner casing at its ends and intermediate thereof in spaced relation from said outer casing, said shoulders, gaskets and flanges forming liquid seals at opposite ends of the said inner casing and intermediate thereof, positive means connecting one set of flanges and shoulders together and drawing all of said flanges and shoulders into sealing engagement with said gaskets and thereby positively prevent relative rotation or angular displacement of said casings, shaft bearings detachably secured to the ends of said inner casing, said bearings having sleeve or hub portions longitudinally and slidably fitting in sockets of said outer casing whereby said bearings are maintained in longitudinal alignment by a plurality of means at each end of the pump.

8. A multi-stage fluid pressure pump including an impeller shaft, an inner casing mounted about the same, an outer casing surrounding the inner casing, said inner and outer casings having cooperating inlet and discharge openings, said casings having cooperating shoulders and flanges defining chambers spaced radially and longitudinally of the shaft and arranged to receive fluids under different pressures, one of said chambers having means for conducting fluids from the first stage of the pump to said chamber, the last chamber being in direct communication with the discharge opening of said pump, resilient compressible gaskets located at the ends of the chambers and between the shoulders and flanges, positive means passing through one flange and its cooperating gasket and threaded for engaging the adjacent shoulder to draw all of said flanges, shoulders and gaskets into sealing condition and thereby simultaneously fixedly secure said inner and outer casings against angular displacement, the other gaskets forming means to retard the longitudinal expansion of the inner casing relative to the outer casing when the inner casing is heated in advance of the outer casing.

MICHAEL D. AISENSTEIN.